Dec. 8, 1970  J. W. DUCKETT  3,545,039
APPARATUS FOR MOLDING ARTICLES
Filed Jan. 12, 1968  8 Sheets-Sheet 7

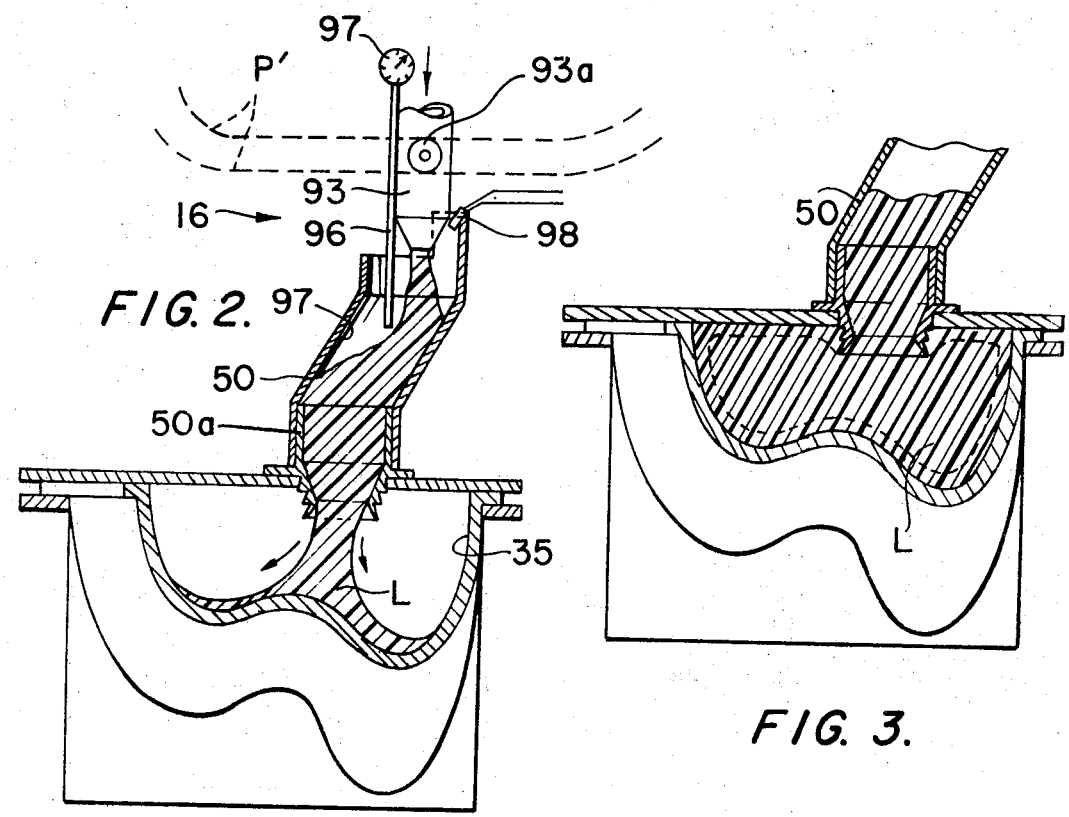
FIG. 2.
FIG. 3.
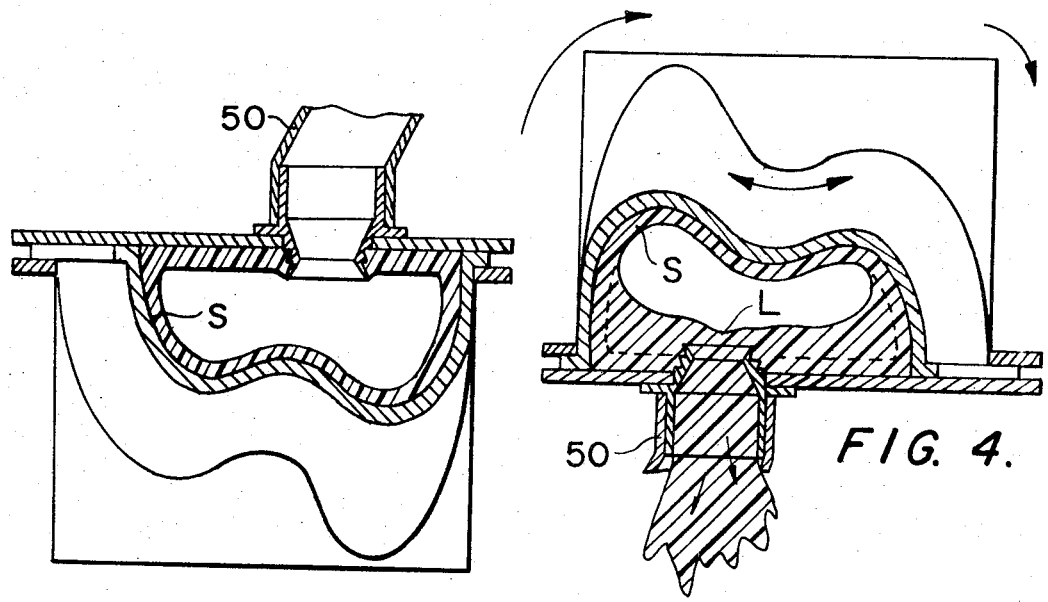
FIG. 5.
FIG. 4.
INVENTOR.
JOHN W. DUCKETT
ATTORNEYS

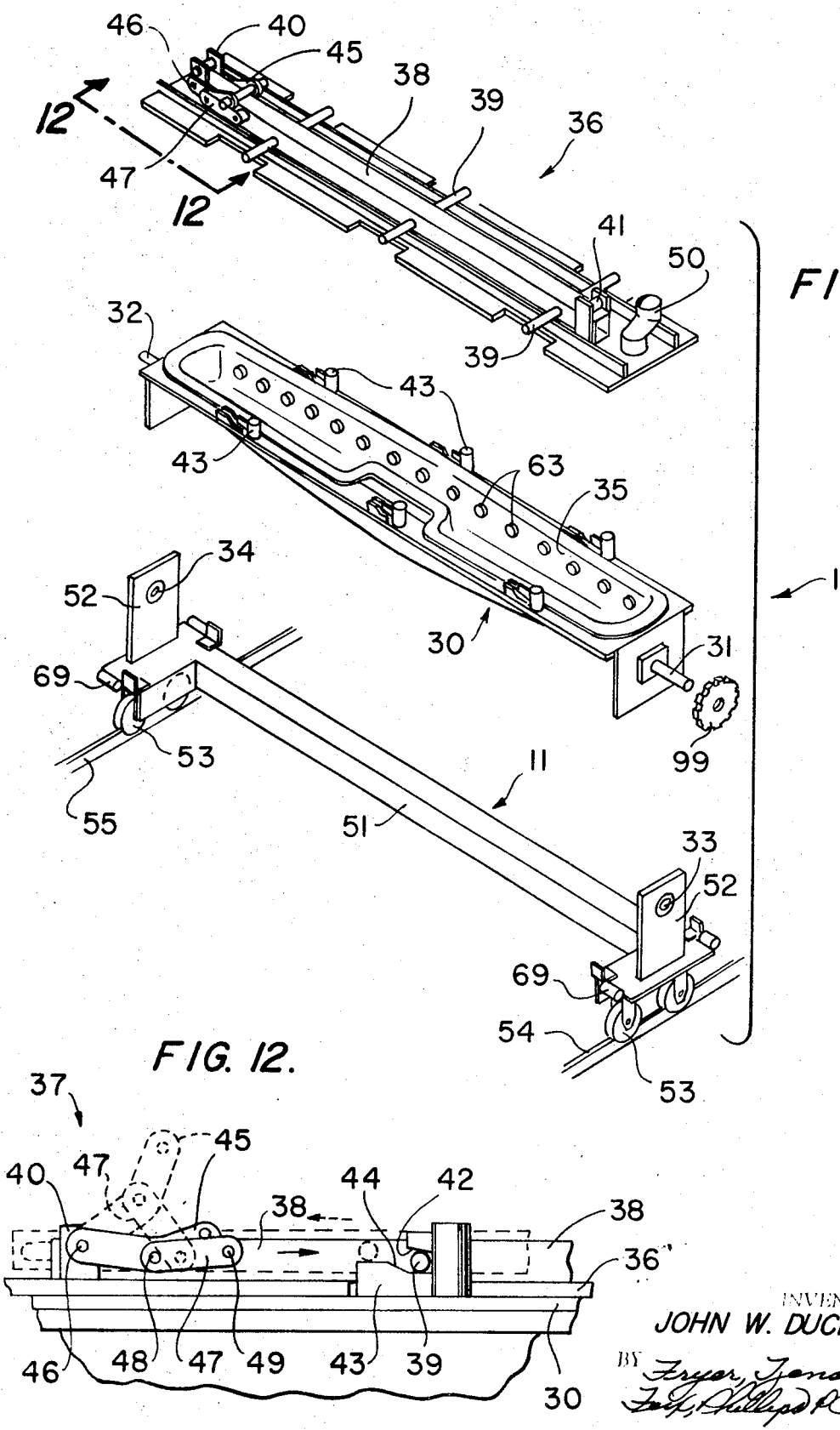

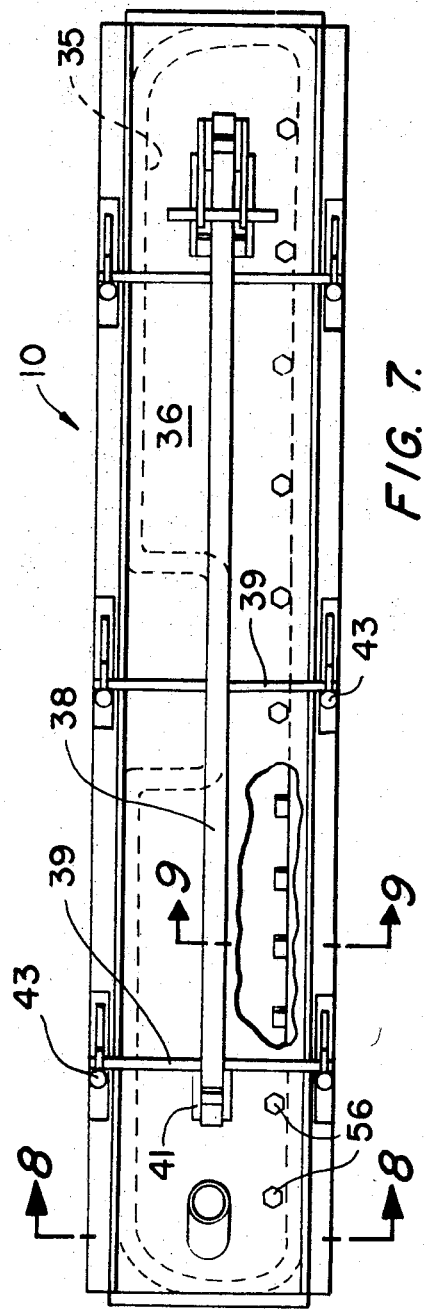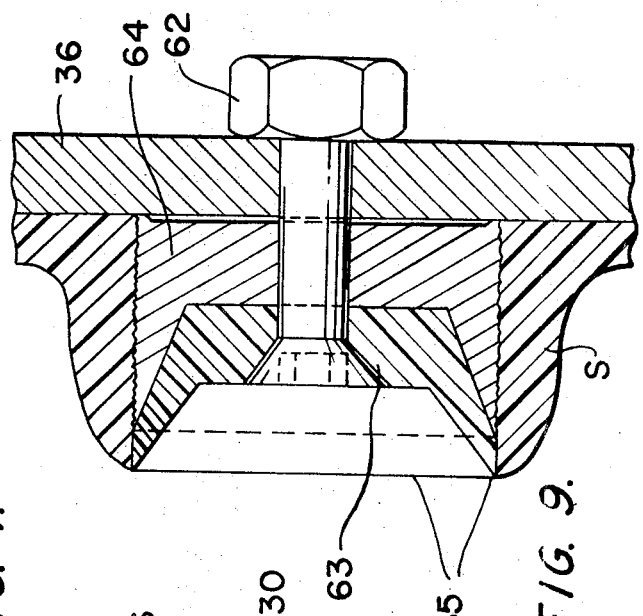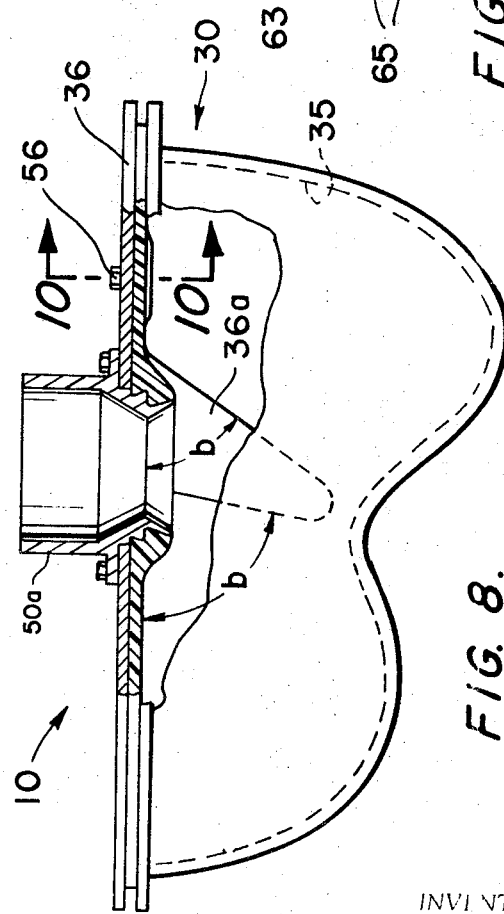

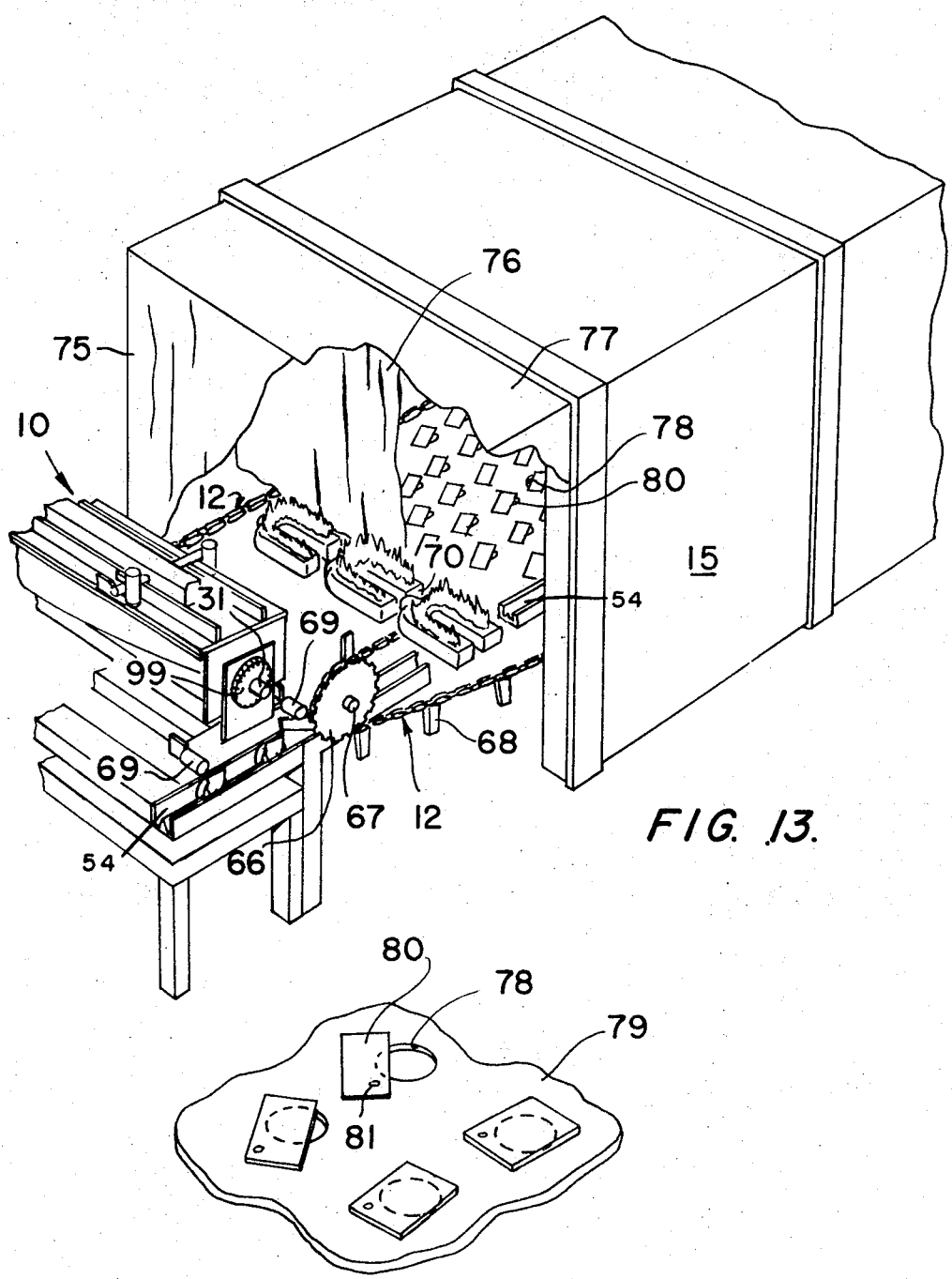

INVENTOR.
JOHN W. DUCKETT
BY Fryer, Tjensvold,
Feix, Phillips & Lempio
ATTORNEYS Dec. 8, 1970  J. W. DUCKETT  3,545,039
APPARATUS FOR MOLDING ARTICLES
Filed Jan. 12, 1968  8 Sheets-Sheet 8

INVENTOR.
JOHN W. DUCKETT
BY Fryer, Tjensvold,
Feix, Phillips & Lempio
ATTORNEYS United States Patent Office 3,545,039
Patented Dec. 8, 1970

3,545,039
APPARATUS FOR MOLDING ARTICLES
John W. Duckett, Tiburon, Calif., assignor, by mesne assignments, to Ward Manufacturing Co., Inc., Sausalito, Calif., a corporation of California
Filed Jan. 12, 1968, Ser. No. 697,471
Int. Cl. B29c 5/10
U.S. Cl. 18—4     16 Claims

ABSTRACT OF THE DISCLOSURE

An apparatus for molding articles comprises a conveyor means for sequentially moving a mold assembly through a first heating means to heat the mold to a predetermined temperature and to a filling means whereat the mold is filled with a curable liquid material. The filled mold is then passed through a second heating means to solidify the material therein and through a curing means for heating the mold to a predetermined temperature to cure the material.

---

Various molding techniques have been proposed for forming plastic articles. The so-called slush molding technique is distinguished from other molding techniques in that a liquid material is poured into a mold and solidified therein solely by the application of heat thereto. The liquid material may comprise a vinyl chloride resin suitably mixed with a plasticizer, for example. Generally speaking, the thickness of the finished article will increase in direct proportion to the amount of heat to which the material contained in the mold is subjected.

The adaptation of such a slush molding technique for mass production line purposes gives rise to numerous problems. For example, the heat must be efficiently applied to the mold in order to achieve the desired wall thickness for a finished hollow article. In addition, it oftentimes proves difficult to provide apparatus and methods for expeditiously filling the mold with a liquid material and for moving the mold through various heating, curing and cooling stations to achieve the precise dimensions and structural desiderata required for such article.

Broad objectives of this invention are to provide an apparatus and method for efficiently and expeditiously molding precisely dimensioned articles which exhibit the structural qualities desired. The apparatus of this invention comprises a conveyor means arranged to move a mold along a predetermined path through the apparatus. A first heating means is arranged for heating the mold to a predetermined temperature prior to when the mold is filled with a curable liquid material. A second heating means is arranged for solidifying the material to a predetermined thickness in the mold before the material is cured.

Other objects of this invention will become apparent from the following description and the accompanying drawings, wherein:

FIGS. 2–5 are cross-sectional views of a mold employed in the FIG. 1 apparatus, shown at various stages of the slush molding operation;

FIG. 6 is an exploded, isometric view of a mold assembly comprising a card having the mold mounted thereon;

FIG. 7 is a top plan view of the mold;

Figure 1:
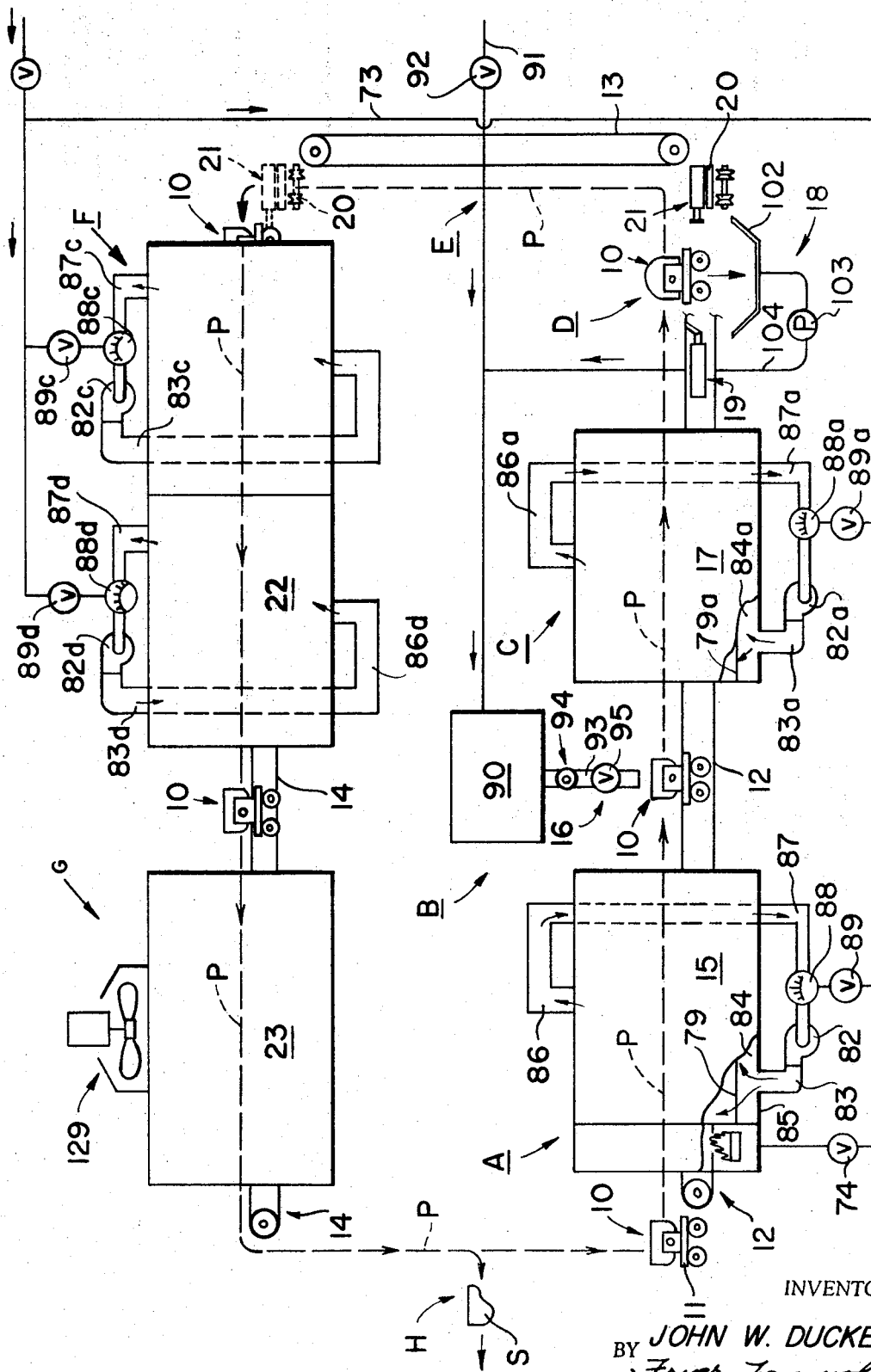
FIG. 1 is a flow diagram schematically illustrating the apparatus and method of this invetnion.
Figure 11:
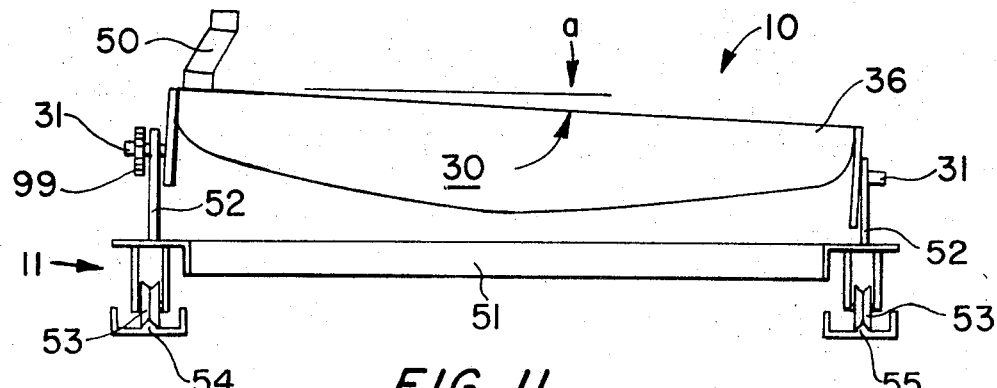
Figure 15:
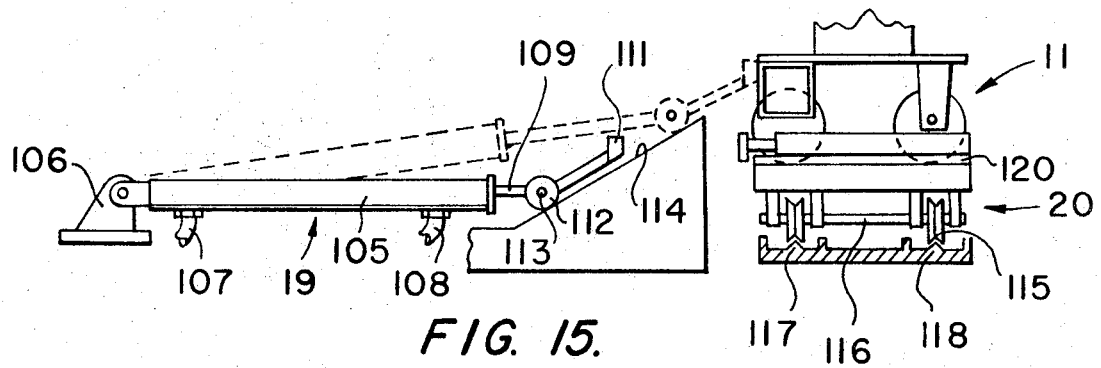
Figure 10:
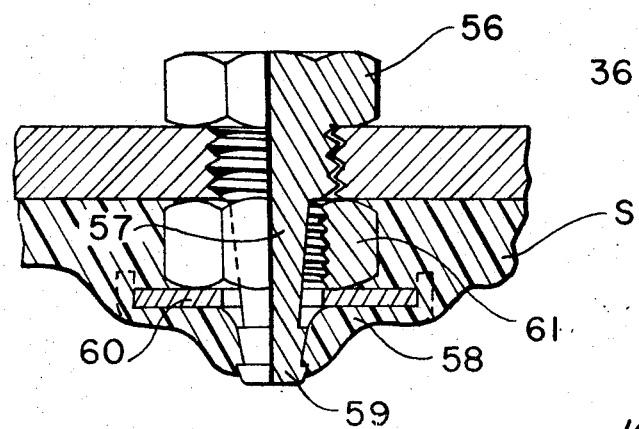
Figure 16:
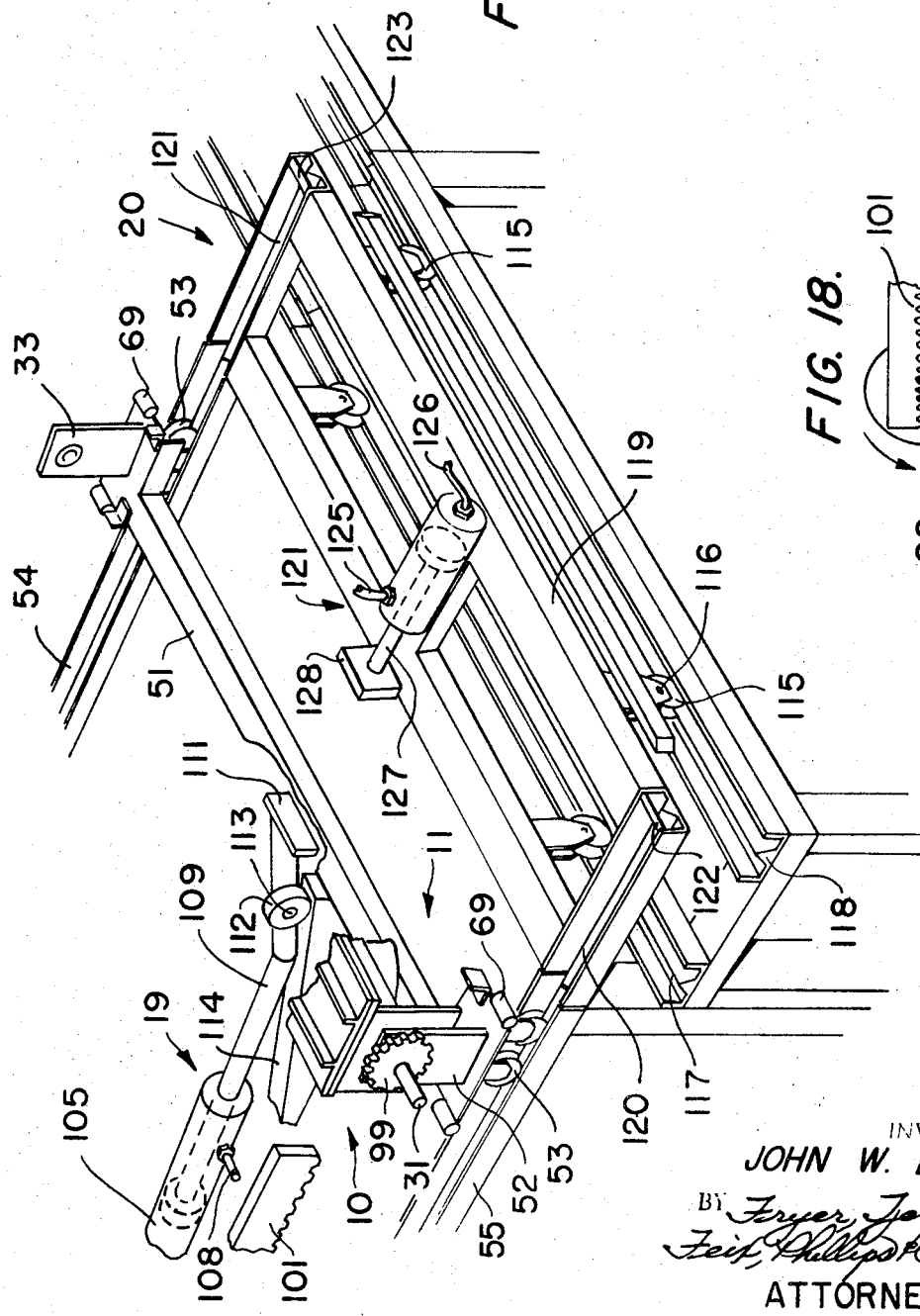
Figure 17:
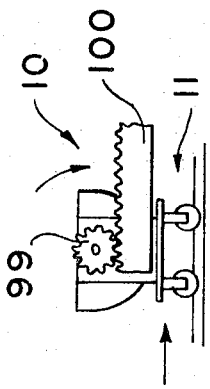
Figure 18:
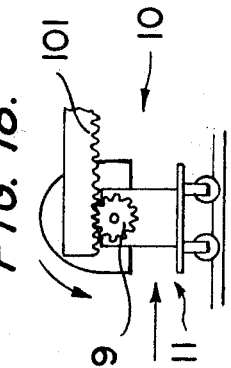
Figure 19:
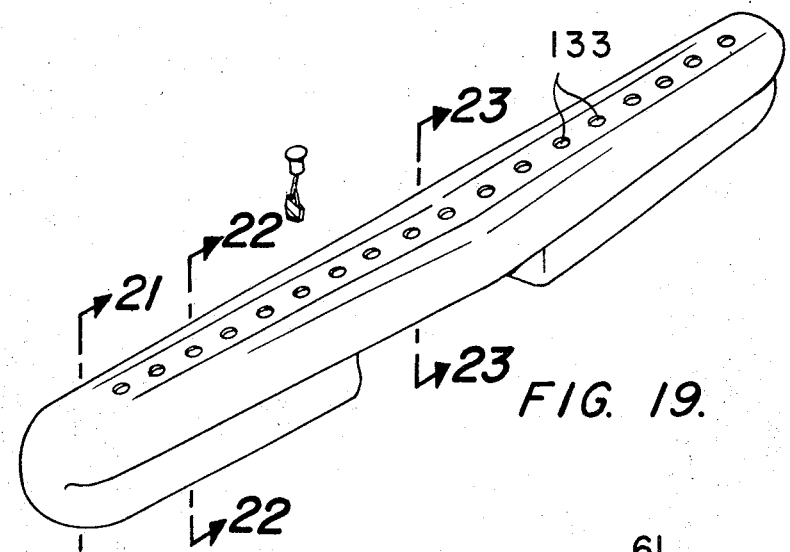
Figure 20:
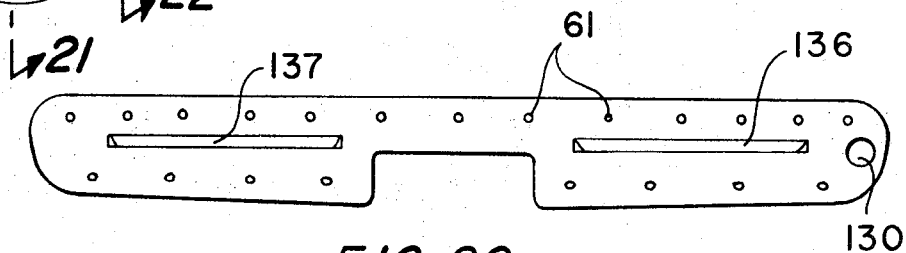

FIGS. 8 and 9 are cross-sectional views taken in the direction of arrows 8—8 and 9—9, respectively, in FIG. 7;

FIG. 10 is a cross-sectional view taken in the direction of arrows 10—10 in FIG. 8;

FIG. 11 is a front elevational view of the mold assembly;

FIG. 12 is a side-elevational view of a latching means taken in the direction of arrows 12—12 in FIG. 6;

FIG. 13 is a partially sectioned, isometric view of a heating means employed in the FIG. 1 apparatus;

FIG. 14 is a partial, isometric view of adjustable vents employed in the heating means;

FIG. 15 is a side elevational view illustrating a hydraulic actuator arranged for selectively moving the mold assembly;

FIG. 16 is a partially sectioned, isometric view illustrating the mold assembly as it would appear prior to its transfer onto a truck;

FIGS. 17 and 18 schematically illustrate two positions of a pinion and rack gear arrangement for pivoting the mold on the cart;

FIG. 19 is an isometric view of a finished article made pursuant to the teachings of this invention;

FIG. 20 is a top plan view of the FIG. 19 article; and

Figure 21:
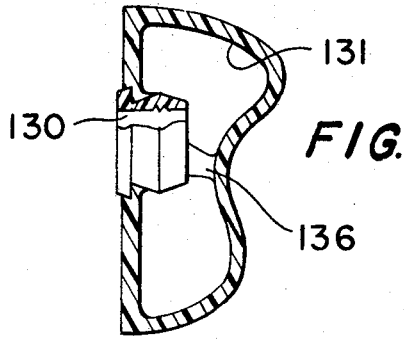
Figure 22:
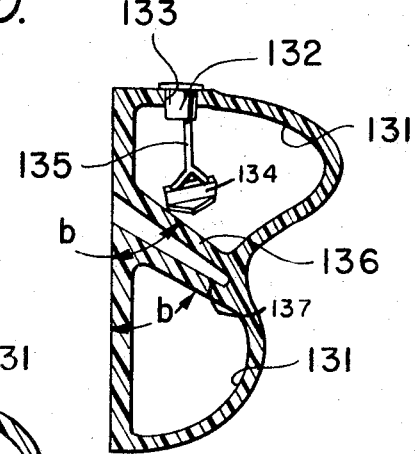
Figure 23:
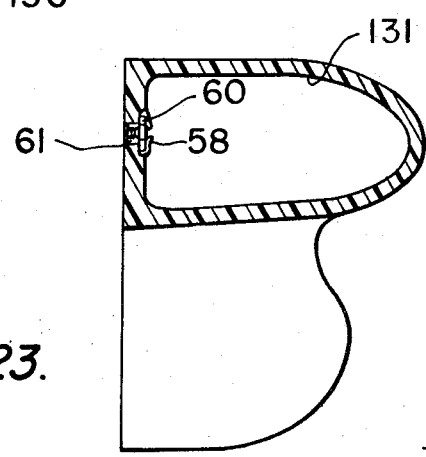

FIGS. 21–23 are cross-sectional views taken in the direction of arrows 21—21, 22—22 and 23—23, respectively, in FIG. 19.

FIG. 1 illustrates the preferred apparatus and method embodiments of this invention. The apparatus appears with a mold assembly 10 moving through various stations thereof. As will be hereinafter more fully described, the mold assembly comprises a cart 11 having a two-part mold pivotally mounted thereon. In general, the apparatus comprises a preheating station A constructed and arranged to uniformly heat the mold to a temperature approximating 200° F., for example. A conveying means is arranged to move the mold assembly along a path P and through the various stations.

Such conveying means may comprise conventional endless conveyor portions 21–14 and tracks suitably arranged to move the mold assembly. Although the conveyor portions are illustrated separately, it should be understood that they may be integrated into a single, continuous conveyor arranged in actual applications to move the mold assembly throughout the entire length of path P.

After the mold has passed through a first heating means 15 at the preheating station, it is either automatically or manually filled at filling station B. The filling station comprises filling means 16 preferably arranged to track and fill the mold assembly with the curable liquid material L (FIG. 2). For example, such material may comprise a vinyl chloride resin suitably combined with a standard plasticizer. The material is preferably composed to solidify solely pursuant to the addition of heat thereto. After the mold is filled, it is passed through a second heating means 17 at a mold heating station C to substantially solidify the material to the thickness and form S (FIG. 3).

Endless conveyor portion 12 moves the mold out of station C and to station D. The mold is inverted on the cart at the latter station to dump out excess liquid into a return means 18. A first actuating means 19 is preferably arranged to automatically move the mold assembly onto a truck 20 after the mold is returned to its normal, upright position. The truck is moved either manually or automatically by conveyor portion 13 to the dotted line position adjacent to a curing station F. A second actuating means 21, mounted on the truck, is suitably extended to move the mold assembly into a third, two-stage heating means 22 of the curing station.

Endless conveyor portion 14 is suitably arranged to move the mold assembly through the third heating means and a cooling means 23 at a cooling station G. The mold is then moved to a discharge station H whereat the finished article is stripped out of the mold. The empty mold assembly is then moved to its original position adjacent to station A to initiate the above described procedure. The specific constructions and arrangements of the preferred apparatus will now be described.

Referring to FIGS. 6 through 11, mold assembly 10 comprises a die portion 30 pivotally mounted by spaced stub shafts 31 and 32 in bearings 33 and 34 of cart 11. The die portion forms a chamber 35 adapted to be closed by a cover portion 36. The cover portion preferably comprises V-shaped extensions 36a (FIG. 8) secured thereto to extend into chamber 35 for purposes hereinafter explained. As clearly illustrated in FIG. 12, the cover and die portions are secured together by a latch means 37 shown in its locked position.

The latch means comprises a reciprocal bar 38 having three sets of laterally extending lock lugs 39 secured thereto. The bar is slidably mounted in spaced channel members 40 and 41. Each lock lug is arranged to engage respective slots 42 formed in brackets 43 secured to the die portion. Upon leftward movement of bar 38 in FIG. 12 each lock lug 39 will ride over a cam ramp 44 to move the locking means to its unlocked position. The bar may be reciprocated by a handle member 45 pivotally mounted on channel member 40 by a pivot pin 46.

The first ends of a pair of links 47 are in turn pivotally connected at a mid-portion of the handle member by pivot pins 48. The second ends of the links are pivotally mounted by pivot pins 49 to form an overcenter toggle mechanism. Thus, when the locking means is moved from its dotted to full line position in FIG. 12, pivot pins 48 will move "overcenter" relative to pivot pins 46 to positively lock the two mold sections together. A spout 50 is secured to the top plate of the die portion to communicate liquid material to chamber 35 as will be hereinafter more fully described.

Cart 11 comprises a crossbar 51 secured to spaced brackets 52 having wheels 53 suitably mounted thereon. The wheels preferably comprise notched peripheries arranged to engage spaced, V-shaped rails 54 and 55, forming part of the conveying means. The rails, although not fully illustrated, are arranged along path P (FIG. 1) where needed to guide truck movements therealong. As clearly illustrated in FIG. 11, the two-part mold is mounted on the cart to form an angle a, preferably selected from a range of from 5° to 30°, with respect to a horizontal plane. Thus, when the mold cavity is filled via spout 50 (FIG. 2), the liquid will tend to dispel air therefrom prior to complete filling to prevent disadvantageous air pockets from being formed in the finished article.

In the particular application herein described, the top plate of the mold's cover portion 36 has a series of aligned bolts 56 threadably attached thereto for securing a series of fastening assemblies to the cover portion (FIG. 10). A shank 57 of each bolt carries a plastic cap 58 on the serrated end 59 thereof. The cap retains an elongated metallic backup plate 60 and a fastening means 61, preferably an internally threaded nut, in assembled relationship. The cap, plate and nut, constituting the fastening assembly, are molded into the finished article S to provide a series of means for attaching the article to the bumper of an automobile, for example (FIGS. 20 and 23). Plates 60 could be arranged to extend substantially the full length of the cover portion, although in actual application six separate plates were arranged at the top of the finished article and four at the bottom to accommodate nuts 61 (FIG. 20).

As illustrated in FIG. 9, a series of bolts 62, detachably secured to the mold, are each attached to cup-shaped members 63 and 64. Member 64 is preferably metallic whereas member 63 may constitute "Teflon" or other suitable material exhibiting high heat insulative properties. Member 63 terminates in tapered edge portions 65 to aid in removal of the finished article therefrom to thus form a well-defined hole in the article. The substantially perfect formation of such hole is further aided by the insulative properties of member 63 which discourages vinyl "build-up" therearound. Spout 50 may also comprise a tapered "Teflon" tip member 50a (FIG. 8) to form a well-defined hole in the finished article (hole 130 in FIG. 21).

Referring to FIGS. 13 and 14, the mold assembly is introduced into the two-stage first heating means 15 by the conveyor means comprising spaced endless chains 12 and tracks 54 and 55. The endless chains are each driven by a sprocket 66 arranged to be driven by a drive shaft 67. The drive shaft may be suitably integrated into the drive train (not fully shown) of the apparatus to be driven by a main, electric drive motor thereof. A plurality of lugs 68 are suitably attached to each chain to engage projections 69 secured to cart 11 to move the mold assembly in a linear direction through station A.

The first heating means is preferably of the two-stage type comprising a preheater having a plurality of conventional infra-red or other suitable gas burners 70, arranged to quickly subject the mold to heat approximating 1500° F., for example. As more clearly illustrated in FIG. 1, the gas for the preheater may be communicated thereto by a main gas line 71, a main valve 72, branch line 73 and valve 74. Heat resistant flexible curtains 75 and 76 may be arranged to permit the conveyor means to move the mold through the substantially closed preheater and main heating chamber 77.

The main heating chamber comprises a plurality of openings 78 formed in a bottom floor 79 thereof to communicate heated air to the chamber. As more clearly illustrated in FIG. 14, the extent to which each opening is exposed may be adjusted by selective movement of a plate 80, pivoted to the floor by a pivot pin 81. Thus, the temperature at any place in the main heating chamber may be closely controlled and stabilized to subject the mold to the heat desired. In most applications, the various adjustments would be regulated to provide a substantially even heat distribution throughout the main heating chamber.

Referring briefly to FIG. 1, heated air is circulated through the main heating chamber by a pump 82 which pumps air through an inlet conduit 83 and into a chamber 84 formed in part by floor 79 and closed by bottom wall 85. The air rises through adjustable openings 78 and is returned to the pump via an outlet conduit 86 and branch conduit 87. A conventional gas burning heater 88 is suitably arranged in the latter conduit to heat the air to a desired temperature, such as 200° F. to 250° F. A valve 89 may be arranged to selectively communicate the desired amount of gas from conduit 73 to the heater.

The conveyor means proceeds to move the mold to filling station B whereat the mold cavity is filled with a liquid (FIG. 2). The curable liquid material is communicated to a stationary reservoir 90 of the filling station via a main line 91 and valve 92 (FIG. 1). A conduit 93 may be movably mounted, as schematically illustrated at 94, to the reservoir to track and position the conduit in spout 50 for filling purposes. Such movable mounting may comprise, for example, a stationary rail having a portion horizontally mounted relative to path P and suitably arranged to guide a roller 93a or the like mounted on conduit 93. The rail tracks P', shown in dotted lines in FIG. 2, may be arranged to initially insert conduit 93 into spout 50, permit horizontal movement of the spout until the mold is filled and move the conduit out of the spout after filling.

A valve 95 (FIG. 1) may be actuated either automatically or manually to initiate filling of the mold cavity. A conventional sensor tube 96 may be attached to conduit 93 to extend into the passage formed by the spout to detect when the cavity is filled completely. Such filling may be visually detected by the operator on a gauge 97, for example. If so desired, an electrical microswitch 98 may be suitably mounted on spout 50 to automatically actuate valve 95 to fill the mold by suitably connected control means (not shown). Likewise, gauge 97 could be suitably arranged to automatically close the valve after the mold is filled.

The above mentioned movement of conduit 93, relative to the mold assembly, could also be fully automated pursuant to skill of the art teachings. Upon completion of such filling, conduit 93 is moved out of communication with the spout and the conveyor means proceeds to move the mold through second heating means 16 at station C. The second heating means is substantially identical to the first heating means (FIG. 13) and functions to substantially solidify the liquid. Corresponding parts are depicted by identical numerals. The numerals depicting corresponding parts at station C are accompanied by a subscript *a*.

Referring to FIGS. 16–18, a pinion gear 99 is detachably secured to rotatable shaft 31 of the mold to sequentially engage suitably mounted stationary rack gears 100 and 101. When the mold is moved into station D, the pinion gear will first engage rack gear 100 to pivot the mold clockwise on the cart (FIG. 17) to the FIG. 18 position. Nonsolidified liquid contained in the mold cavity will be discharged into a tank 102 of return means 18. A pump 103 is arranged to pump such liquid back to filling tank 90 via a line 104 and line 91. Rack gears (not shown) similar to 100 and 101 could be arranged in one or more ovens 15, 17, 22 and 23 to rotate the mold for even heat distribution purposes.

Subsequent to such dumping the pinion gear will engage second rack gear 101 to pivot the mold counter-clockwise to its original, upright position. First actuating means 19 (FIGS. 1, 15 and 16) is then actuated either manually or automatically to move the mold assembly onto truck 20 at station E. The first actuating means preferably comprises a double-acting hydraulic actuator having a cylinder 105 thereof pivotally mounted on a stationary lug 106. Fluid connections 107 and 108 may be suitably connected to a conventional control means (not shown) to selectively pressurize either the head or rod end of the jack to move it between the dotted to full line position illustrated in FIG. 16. When one end of the jack is pressurized, the other end may be exhausted in a conventional manner.

Rod 109 has an extension 110 secured thereto which carries a plate 111 thereon. The plate is adapted to engage crossbar 51 of the cart and move it onto truck 20 (FIG. 15). The first actuating means may further comprise a roller 112 rotatably mounted on rod 109 by pivot pin 113. A stationary ramp 114 may be arranged to guide the roller's movements. Thus, when the actuator is in its retracted full line position in FIG. 15, pressurization of the head end of the jack via line 10 will function to extend rod 109. Roller 112 will ride upwardly and rightwardly on ramp 114 to push plate 111 against crossbar 51 of the mold assembly.

Truck 20 comprises wheels 115 mounted for rotation on axles 116 and suitably mounted on spaced rails 117 and 118, arranged to guide the truck in its movements toward curing station F. The truck further comprises a rectangular bed portion 119 having spaced rails 120 and 121 mounted on the ends thereof. The latter rails are arranged coincident with rails 54 and 55 (FIG. 16) to facilitate reception of the mold assembly thereon. End plates 122 and 123 may be arranged at the end of rails 120 and 121 to retain the mold assembly in its correct position on the truck.

Second actuating means 21 may comprise a conventional double-acting hydraulic actuator having its cylinder secured to frame 119 of the truck. When the truck has been moved by conveyor portion 13 to the dotted line position illustrated in FIG. 1, adjacent to the curing station, the head end of the actuator may be pressurized via line 125 and the rod end thereof exhausted via line 126. A rod 127 of the actuator will be extended to move a plate 128 secured thereto into engagement with crossbar 51 of the cart. Further extension of the rod will function to move the mold assembly into station F.

The truck is then moved manually or automatically back to its original, FIG. 16 position by means not shown. Suitable microswitches and control means (not shown) could be arranged at station E to fully automate the movements of the truck. Conveyor portion 14 then engages the mold assembly in the above described manner to move the assembly through station F. Each stage of third heating means 22 is substantially identical to the above described first heating means. Corresponding parts are depicted by like numerals with the numerals for the two stages of the third heating means being accompanied by subscripts *c* and *d*.

The first stage or preheater of the third heating means may subject the mold assembly to heat approximating 600° F., for example. Since certain types of vinyl based plastics scorch at approximately 400° F., the mold assembly is only maintained in such first stage until its temperature approximates 350° F., for example. The second stage then functions to "soak" the mold assembly at such 350° F. temperature. Without the preheater stage, the curing station would be unduly long. Such length would tend to substantially increase the amount of time necessitated for forming the finished article.

The mold is then moved through cooling station G by conveyor portion 14 wherein a fan, schematically illustrated at 129, may be arranged to circulate ambient air therethrough to cool the mold assembly to a predetermined temperature. Conventional cooling means could be arranged at station G to lower the air temperature substantially below ambient. Thereafter, the mold assembly is moved to discharge station H where the operator disconnects and removes the mold's cover portion therefrom. After the finished article is stripped out of the mold's cavity, the cover portion is replaced and the mold assembly is moved to station A to initiate the above described procedure.

The particular article formed by the above described apparatus may comprise the plastic buffer illustrated in FIGS. 19–23. Such buffer is generally described in U.S. Pat. No. 3,284,122 to J. W. Rich for "Shock Absorbing Buffer." When the flexible buffer is stripped out of the mold, it will substantially assume the form illustrated in FIG. 19. A plug (not shown) may be inserted into an opening 130 formed by the removal of spout 50 (FIG. 8). The opening is utilized to selectively fill a chamber 131 of the buffer with a liquid such as water.

Plugs 132 are mounted in orifices 133 and have retaining caps 134 secured thereto by strands 135 to prevent removal of the plugs from the buffer. Nuts 61 (FIGS. 10, 20 and 23), integrated into the composite buffer, may be utilized for securing the buffer to the bumper of an automobile, for example. It should be noted that when water is contained in the two large portions of chamber 131, illustrated in cross-section in FIG. 22, that hollow cross-ribs 136 and 137 will prevent distortion of the buffer due to the water's weight. The crossribs are formed by extensions 36a of cover portion 36 of the mold.

Elimination of such crossribs or horizontal disposition thereof, for example, would normally cause the buffer to sag. Angles *b*, the angles occurring between the plane of the buffer's rear side and the exposed surfaces of the crossribs, are preferably selected from a range of from 20° to 80° (FIG. 22). In an actual application, such angles approximated 50° to 75°. The angles are also illustrated in FIG. 8 as occurring between the plane of the flat cover plate portion 36 and the flat surfaces of extensions 36a.

What is claimed is:
1. An apparatus for molding articles comprising conveyor means having at least one mold assembly operatively associated therewith for movement along a path, said mold assembly having a spout means secured thereto;

first heating means for heating said mold assembly to a predetermined and substantially uniform temperature, said first heating means comprising preheating means for subjecting said mold assembly to a predetermined first temperature and stabilizing heating means for substantially uniformly heating and maintaining said mold assembly at a predetermined second temperature lower than said first temperature;

filling means for filling said mold assembly with a curable liquid material, said filling means comprising a conduit and guide means movably mounting said conduit at said filling means for sequentially communicating said conduit with said spout means, moving said conduit along with said conveying means along said path and simultaneously maintaining such communication until said mold assembly is filled with said liquid and moving said conduit out of communication with said spout means after such filling has been completed;

second heating means for heating said mold assembly to a predetermined and substantially uniform temperature to solidify said material to a predetermined thickness therein; and third heating means for heating said mold assembly to a predetermined and substantially uniform temperature to cure the material retained therein.

2. The invention of claim 1 further comprising removing means for removing nonsolidified material from said mold assembly.

3. The invention of claim 2 further comprising return means for returning said nonsolidified material to said filling station.

4. The invention of claim 2 wherein said removing means comprises means for pivoting said mold assembly to dump said nonsolidified material from said mold assembly under the influence of gravity.

5. The invention of claim 4 wherein said last mentioned means comprises a pinion gear attached to said mold assembly and a stationary rack gear arranged adjacent to said pinion gear to mesh therewith to rotate said mold assembly.

6. The invention of claim 1 further comprising means for cooling said mold assembly after said mold assembly has been subjected to said curing means.

7. The invention of claim 1 wherein said third heating means comprises a first stage for subjecting said mold assembly to a high temperature and a second stage for soaking said mold assembly at a temperature substantially lower than said high temperature.

8. The invention of claim 1 wherein said conveying means comprises spaced tracks having said mold assembly mounted for movement thereon and endless conveying means for engaging said mold assembly to move it along said tracks.

9. The invention of claim 8 wherein said mold assembly comprises a die portion pivotally mounted on a cart and latch means detachably securing a cover portion to said die portion to form a substantially closed chamber in said mold assembly.

10. The invention of claim 8 wherein said conveying means further comprises a truck mounted for movement between said second heating means and said curing means, said truck having means thereon for receiving and retaining said mold assembly thereon.

11. The invention of claim 9 wherein said cover portion has said spout means secured thereto for communicating said filling means with said chamber to fill said mold assembly with said curable liquid material.

12. An apparatus for molding articles comprising conveyor means having at least one mold assembly operatively associated therewith for movement along a path, said mold assembly having a spout means secured thereto;

first heating means for heating said mold assembly to a predetermined and substantially uniform temperature;

filling means for filling said mold assembly with a curable liquid material, said filling means comprising a conduit and guide means movably mounting said conduit at said filling means for sequentially communicating said conduit with said spout means, moving said conduit along with said conveying means along said path and simultaneously maintaining such communication until said mold assembly is filled with said liquid and moving said conduit out of communication with said spout means after such filling has been completed;

second heating means for heating said mold assembly to a predetermined and substantially uniform temperature to solidify said material to a predetermined thickness therein; and third heating means for heating said mold assembly to a predetermined and substantially uniform temperature to cure the material retained therein, said third heating means comprising a first stage for subjecting said mold assembly to a high temperature and a second state for soaking said mold assembly at a temperature substantially lower than said high temperature.

13. An apparatus for molding articles comprising a conveyor means having at least one mold assembly operatively associated therewith for movement along a path, said mold assembly having a spout means secured thereto and said conveyor means comprising spaced tracks having said mold assembly mounted for movement thereon and endless conveying means for engaging said mold assembly to move it along said tracks;

first heating means for heating said mold assembly to a predetermined and substantially uniform temperature;

filling means for filling said mold assembly with a curable liquid material, said filling means comprising a conduit and guide means movably mounting said conduit at said filling means for sequentially communicating said conduit with said spout means, moving said conduit along with said conveying means along said path and simultaneously maintaining such communication until said mold assembly is filled with said liquid and moving said conduit out of communication with said spout means after such filling has been completed;

second heating means for heating said mold assembly to a predetermined and substantially uniform temperature to solidify said material to a predetermined thickness therein; and third heating means for heating said mold assembly to a predetermined and substantially uniform temperature to cure the material retained therein;

said conveying means further comprising a truck mounted for movement between said second heating means and said third heating means, said truck having means thereon for receiving and retaining said mold assembly thereon.

14. The invention of claim 13 further comprising actuating means for moving said mold assembly onto said truck.

15. The invention of claim 13 further comprising actuating means for moving said mold assembly into said curing means.

16. The invention of claim 9 wherein said latch means comprises an overcenter toggle mechanism.

(References on following page)

References Cited

UNITED STATES PATENTS

| | | | |
|---|---|---|---|
| 2,999,517 | 9/1961 | Cervinka | 141—181X |
| 3,056,436 | 10/1962 | Fechheimer et al. | 141—147X |
| 3,093,165 | 6/1963 | Risser | 141—147X |
| 1,488,973 | 4/1924 | Brookes | 264—302 |
| 1,941,802 | 1/1934 | Howell | 25—29 |
| 2,294,476 | 9/1924 | Mooney | 18—26MX |
| 2,342,920 | 2/1944 | Clark | 18—4C |
| 2,713,935 | 7/1955 | Bishop | 18—4CX |
| 2,732,584 | 1/1956 | Bishop | 18—4C |
| 3,101,243 | 8/1963 | Hawkes | 18—4MX |
| 3,151,196 | 9/1964 | Tipton | 18—4PX |
| 3,155,751 | 11/1964 | Morris | 18—4MX |
| 3,270,102 | 8/1966 | Aiken | 18—4MX |
| 3,350,745 | 11/1967 | Schott et al. | 18—26 |

FOREIGN PATENTS

| | | | |
|---|---|---|---|
| 735,742 | 6/1966 | Canada | 141—132 |
| 842,191 | 7/1960 | Great Britain | 25—29 |

J. SPENCER OVERHOLSER, Primary Examiner

J. E. ROETHEL, Assistant Examiner

U.S. Cl. X.R.

18—26